United States Patent
Wang et al.

(10) Patent No.: US 10,245,645 B1
(45) Date of Patent: Apr. 2, 2019

(54) TOOL CARRIER WITH NOTCH, CUTTING INSERT AND METHOD FOR MAKING SAME

(71) Applicant: Kennametal Inc., Latrobe, PA (US)

(72) Inventors: Qi Wang, Greensburg, PA (US); Neal Myers, Greensburg, PA (US); Shi Chen, N. Huntingdon, PA (US); Igor Kaufmann, Nuremberg (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 15/722,728

(22) Filed: Oct. 2, 2017

(51) Int. Cl.
*B23B 27/00* (2006.01)
*B23B 27/18* (2006.01)

(52) U.S. Cl.
CPC ...... *B23B 27/18* (2013.01); *B23B 2200/0495* (2013.01); *B23B 2205/12* (2013.01); *B23B 2226/125* (2013.01); *B23B 2240/08* (2013.01)

(58) Field of Classification Search
CPC . B23B 27/18; B23B 27/20; B23B 2200/0447; B23B 2240/08; B23B 2205/12; B23B 2205/00; B23B 27/145
See application file for complete search history.

(56) References Cited

U.S. PATENT DOCUMENTS

| | | | | |
|---|---|---|---|---|
| 1,903,077 | A * | 3/1933 | Wolf | B23B 27/18 219/77 |
| 2,944,323 | A * | 7/1960 | Stadler | B23B 27/16 407/110 |
| 3,667,099 | A * | 6/1972 | Palmer | B23B 27/148 428/557 |
| 6,155,755 | A * | 12/2000 | Kanada | B23B 27/18 407/118 |
| 2001/0022017 | A1 * | 9/2001 | Mack | B23B 31/1071 29/469.5 |
| 2002/0190105 | A1 * | 12/2002 | Kanada | B23B 27/145 228/122.1 |
| 2004/0256442 | A1 * | 12/2004 | Gates, Jr. | B23B 27/148 228/141.1 |
| 2007/0207715 | A1 * | 9/2007 | Webb | B23B 27/145 451/540 |
| 2015/0202730 | A1 * | 7/2015 | Watanobe | B24B 3/34 407/115 |
| 2017/0189969 | A1 * | 7/2017 | Hirosaki | B23B 27/14 |
| 2018/0141131 | A1 * | 5/2018 | Matsuzawa | C22C 19/07 |
| 2018/0272433 | A1 * | 9/2018 | Sasaki | B23B 27/145 |

* cited by examiner

*Primary Examiner* — Will Fridie, Jr.
(74) *Attorney, Agent, or Firm* — Matthew S. Bedsole

(57) ABSTRACT

A cutting insert includes a tool carrier having a body with a pocket, and a cutting tip affixed to the pocket by brazing. The pocket is defined by a vertical back wall and a horizontal support surface. A notch is formed at the intersection between the vertical back wall and the horizontal support surface. The notch has a non-planar first portion proximate the vertical back wall and formed with a radius, R1, and a planar second portion extending between the first portion and the horizontal support surface and formed at an inclination angle with respect to a plane parallel to the horizontal support surface of the pocket. The design of the notch significantly reduces thermal stress and eliminates the formation of cracks in the pocket of the tool carrier when using an injection molding process to form the tool carrier.

18 Claims, 5 Drawing Sheets

TOOL CARRIER WITH NOTCH, CUTTING INSERT AND METHOD FOR MAKING SAME

FIELD OF THE INVENTION

The present invention relates to cutting inserts and, more particularly, to cutting inserts comprising a cutting tip made of a super-hard material, such as PCBN, and the like, affixed onto a tool carrier made of a suitable material, such as cemented carbide, and the like.

BACKGROUND OF THE INVENTION

A super-hard cutting edge is provided to a cutting insert by affixing a hard-metal body, such as a PCBN tip, to what is commonly known as a tool carrier or carrier by means of a brazing material, such as a liquid brazing solder.

Polycrystalline diamond (PCD) or polycrystalline cubic boron nitride (PCBN), diamond and diamond composite materials are commonly used to provide the super-hard cutting edge for cutting tools, such as cutting inserts used in metal machining.

Referring now to FIGS. 8 and 9, a conventional tool carrier 100 (also known as a blank) includes a pocket 102 defined by a vertical back wall 102a and a horizontal seating surface 102b, and a brazing notch 104 at the intersection between back wall 102a and the seating surface 102b. The brazing notch 102 is formed with a radius, R, for accommodating brazing material when affixing a cutting tip (not shown) to the tool carrier 100. Typically, the brazing notch 102 has a radius, R, of at least 0.10 mm (0.004 in).

A problem has been observed when the tool carrier 100 is manufactured using an injection molding process. The tool carrier 100 may be made of a cemented carbide material. During the injection molding process, the hot carbide material of the tool carrier 100 shrinks in the mold when contacting the mold surfaces. Because shrinkage is proportional to the dimensions of the tool carrier 100, as shown by the arrows in FIG. 8, the hot carbide material shrinks more in the horizontal direction, which causes stress concentration near the brazing notch 104. In addition, a crack in the tool carrier 100 may occur, due to friction force between the mold (or die) and the tool carrier 100 when hot material is injected into the mold (not shown). As the temperature decreases in the tool carrier 100, the tool carrier 100 begins to shrink. Because the tool carrier 100 shrinks differently in the horizontal and vertical direction, the mold will "drag" the notch portion of the tool carrier 100, thus creating cracks, which is detrimental to the performance of the tool carrier 100.

Another problem has been observed when the cutting tip is affixed to the tool carrier. Typically, a chamfer is formed at the corners of the cutting tip that are adjacent the pocket walls in an attempt to provide sufficient bonding force between the cutting tip and the tool carrier, and to avoid interference between the cutting tip and the tool carrier. Unfortunately, producing the chamfer in the cutting tip increases the manufacturing cost of the cutting insert.

The present invention has been developed in view of the foregoing.

SUMMARY OF THE INVENTION

The problem of the formation of cracks in a tool carrier during the manufacturing process is solved by providing a notch at the intersection between the vertical back wall and the horizontal support surface of the pocket of the carrier formed with a non-planar first portion having a radius and a planar second portion having an inclination angle with respect to the horizontal support surface. The planar second portion allows the mold to move relative to the tool carrier during shrinkage of the tool carrier to reduce stress in the vicinity of the notch, thereby eliminating the formation of cracks in the tool carrier. In addition, the notch eliminates the need to produce a chamfer in the cutting tip, thereby decreasing manufacturing cost of the cutting insert.

In one aspect of the invention, a tool carrier for a cutting insert, the tool carrier comprises a body; a pocket formed in the body for accommodating a cutting tip of a cutting insert, the pocket defined by a vertical back wall and a horizontal support surface; and a notch formed at an intersection between the vertical back wall and the horizontal support surface of the pocket, wherein the notch has a non-planar first portion proximate the vertical back wall and formed with a radius, R1, and a planar second portion extending between the first portion and the horizontal support surface and formed at an inclination angle, A, with respect to a plane parallel to the horizontal support surface of the pocket.

In another aspect of the invention, a cutting insert comprises a cutting tip and a tool carrier. The tool carrier comprises a body; a pocket formed in the body for accommodating a cutting tip of a cutting insert, the pocket defined by a vertical back wall and a horizontal support surface; and a notch formed at an intersection between the vertical back wall and the horizontal support surface of the pocket, wherein the notch has a non-planar first portion proximate the vertical back wall and formed with a radius, R1, and a planar second portion extending between the first portion and the horizontal support surface and formed at an inclination angle, A, with respect to a plane parallel to the horizontal support surface of the pocket.

In yet another aspect of the invention, a method for manufacturing a tool carrier for a cutting insert by using an injection molding process, the tool carrier comprising a body and a pocket formed in the body for accommodating a cutting tip of a cutting insert, the method comprising affixing the cutting tip to the pocket of a tool carrier by brazing, wherein the pocket includes a vertical back wall, a horizontal support surface, and a notch formed at an intersection between the vertical back wall and the horizontal support surface of the pocket for accommodating brazing material, and wherein the notch has a non-planar first portion proximate the vertical back wall and formed with a radius, R1, and a planar second portion extending between the first portion and the horizontal support surface and formed at an inclination angle, A, with respect to a plane parallel to the horizontal support surface of the pocket, and wherein the notch eliminates formation of cracks in the tool carrier during the injection molding process.

These and other aspects of the present invention will be more fully understood following a review of this specification and drawings.

BRIEF DESCRIPTION OF THE DRAWINGS

While various embodiments of the invention are illustrated, the embodiments shown should not be construed to limit the claims. It is anticipated that various changes and modifications may be made without departing from the scope of this invention.

DETAILED DESCRIPTION OF THE INVENTION

Figure 1:
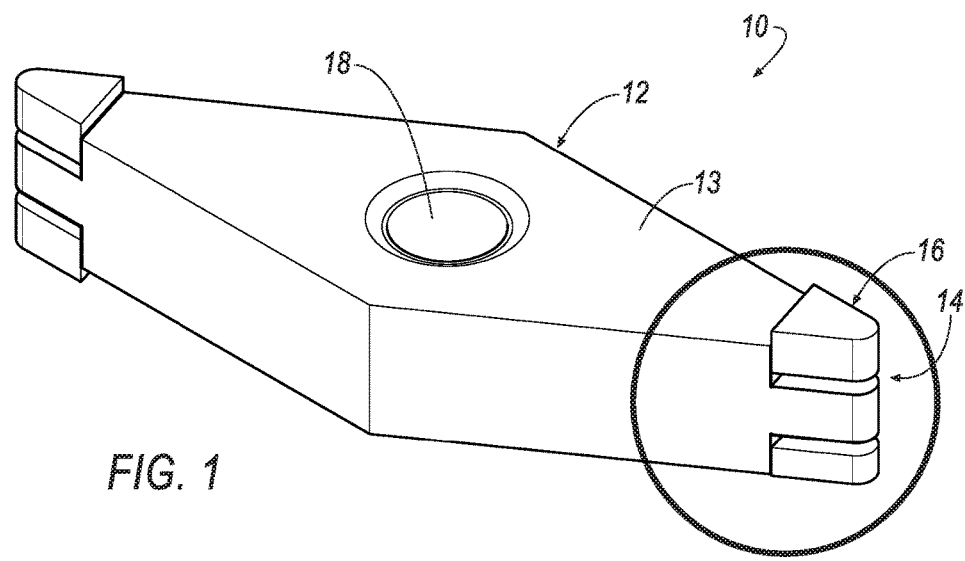
FIG. 1 is an isometric view of a cutting insert in accordance with an aspect of the invention.

Referring now to FIGS. 1-6, a cutting insert 10 is shown according to an embodiment of the invention. In general, the cutting insert 10 includes a tool carrier 12 having a body 13 with at least one pocket 14. The cutting insert 10 also includes at least one cutting tip 16 affixed to the tool carrier 12. In the illustrated embodiment, the tool carrier 12 has a total of four pockets 14 and four cutting tips 16 affixed thereto. However, it will be appreciated that the invention is not limited by the number of pockets and cutting tips, and that the invention can be practiced with any desirable number of pockets and cutting tips.

As used herein, the term "super-hard material" is taken to mean materials with Vickers hardness greater than about 25 GPa. Such materials include, but is not limited to, diamond, cubic boron nitride, boron sub-oxide, boron carbide, polycrystalline diamond (PCD), polycrystalline cubic boron nitride (PCBN), and silicon carbide-bonded diamond (ScD).

As used herein, the term "PCBN" is taken to mean polycrystalline cubic boron nitride, which typically comprises grains of cubic boron nitride dispersed within a binder phase comprising metallic and/or ceramic phases.

As used herein, the term "cutting insert" refers to pieces of tungsten carbide or alternative cutting material mechanically held, brazed, soldered, or welded into position on dies, or substrate carriers, and discarded when worn out, others being fitted in their place.

As used herein, the term "tool carrier" refers to a rigid body that holds a cutting tip or tips firmly in place so that they can be utilized in a turning, milling, boring, cutting, or drilling application.

The tool carrier 12, also known as a blank, carrier, and the like, has an aperture 18 for receiving a fastener (not shown) when mounting the cutting insert 10 to a cutting tool (not shown). Each pocket 14 is defined by a vertical back wall 14a and a horizontal support surface 14b that is substantially perpendicular to the vertical back wall 14a. The pockets 14 are substantially identical to each other, so only one pocket will be described herein for brevity.

Figure 2:
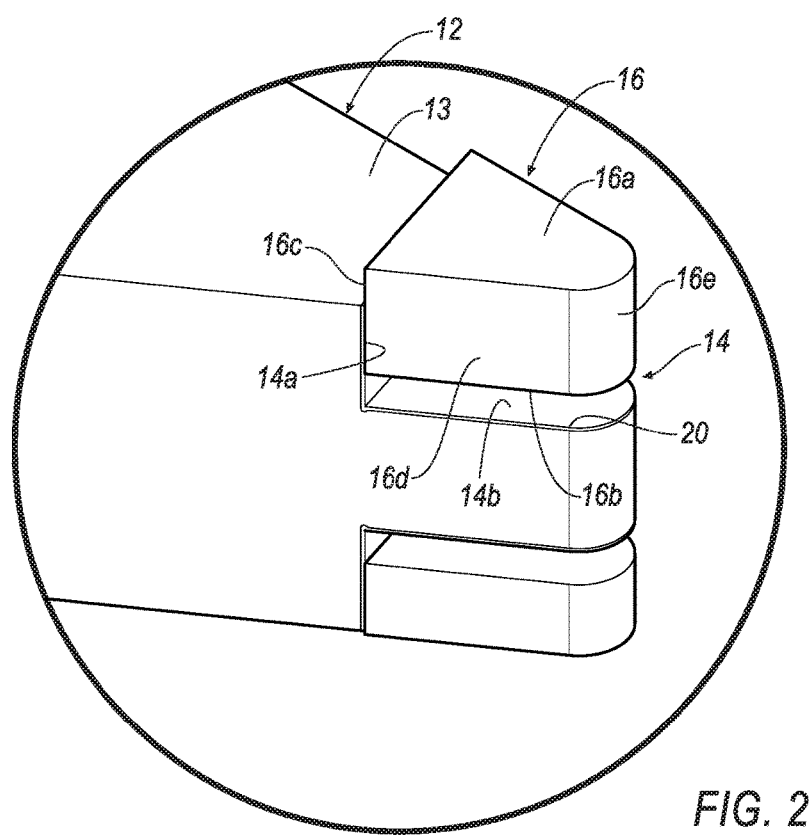
FIG. 2 is an enlarged view of the tool carrier, carrier pocket and cutting tip of the cutting insert of FIG. 1.
Figure 3:
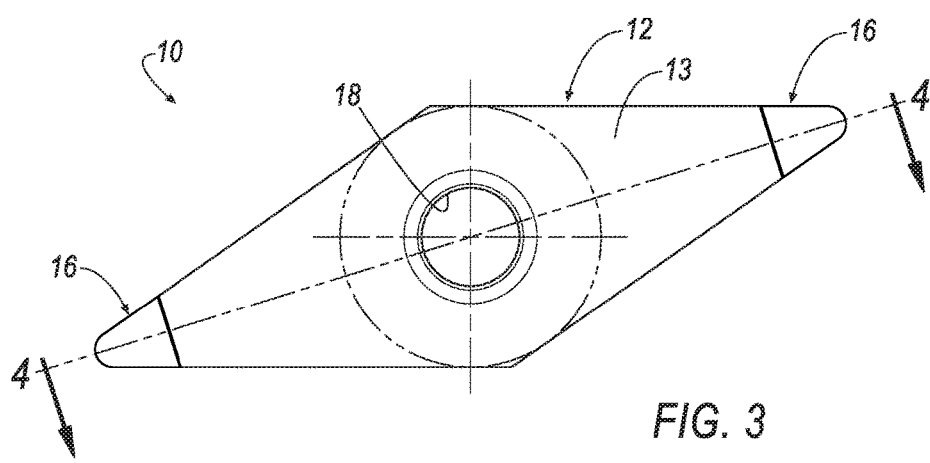
FIG. 3 is a top view of the cutting insert of FIG. 1.
Figure 4:
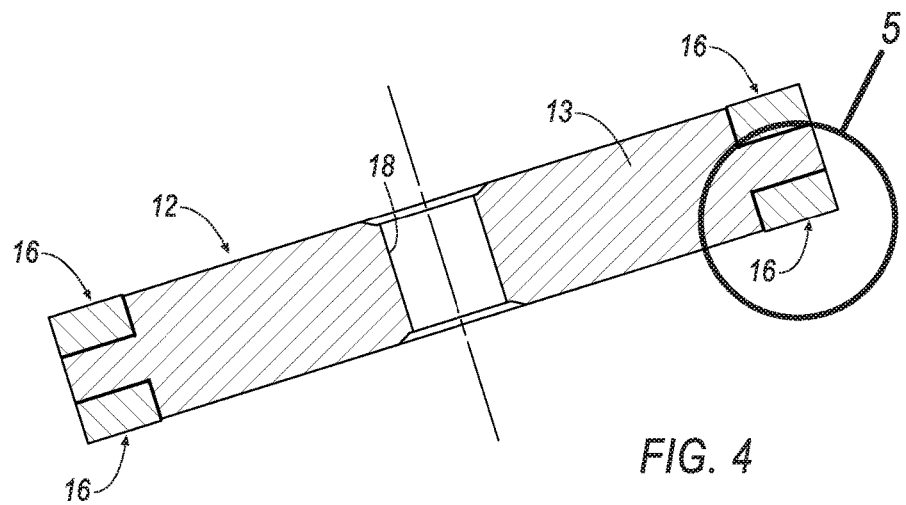
FIG. 4 is a cross-sectional view of the cutting insert taken along line 4-4 of FIG. 3.
Figure 5:
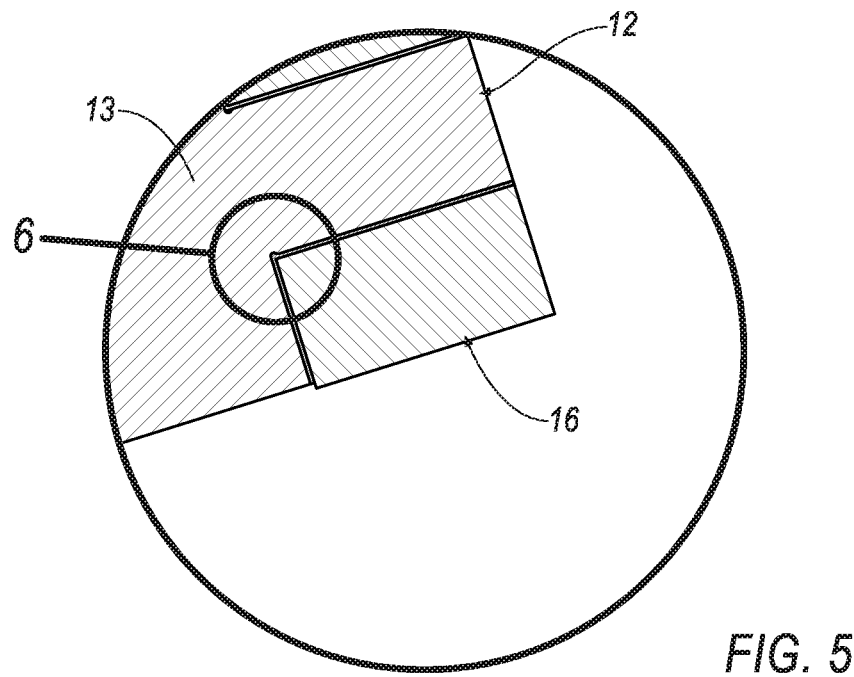
FIG. 5 is an enlarged view of the tool carrier, carrier pocket and cutting tip of the cutting insert shown in FIG. 4.
Figure 6:
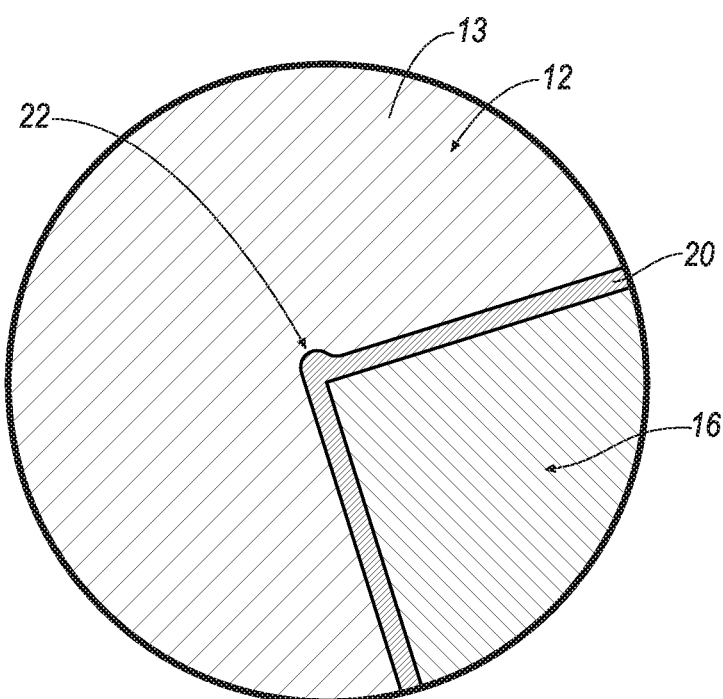
FIG. 6 is an enlarged view of the tool carrier, carrier pocket and cutting tip of the cutting insert shown in FIG. 5.
Figure 7:
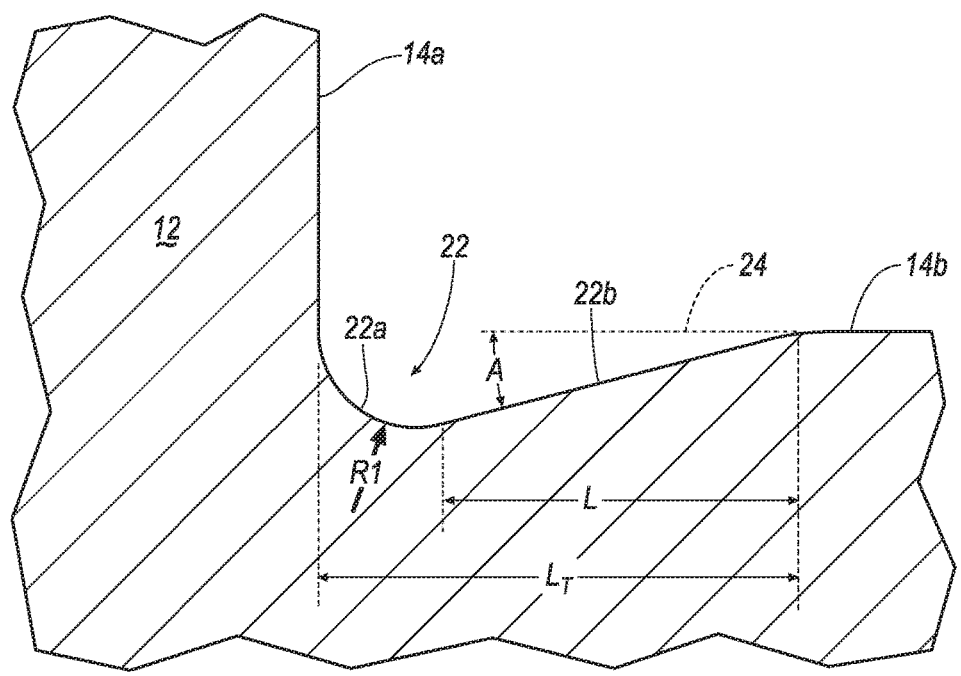
FIG. 7 is an enlarged cross-sectional view of the notch formed in the carrier pocket in accordance with an aspect of the invention.
Figure 8:
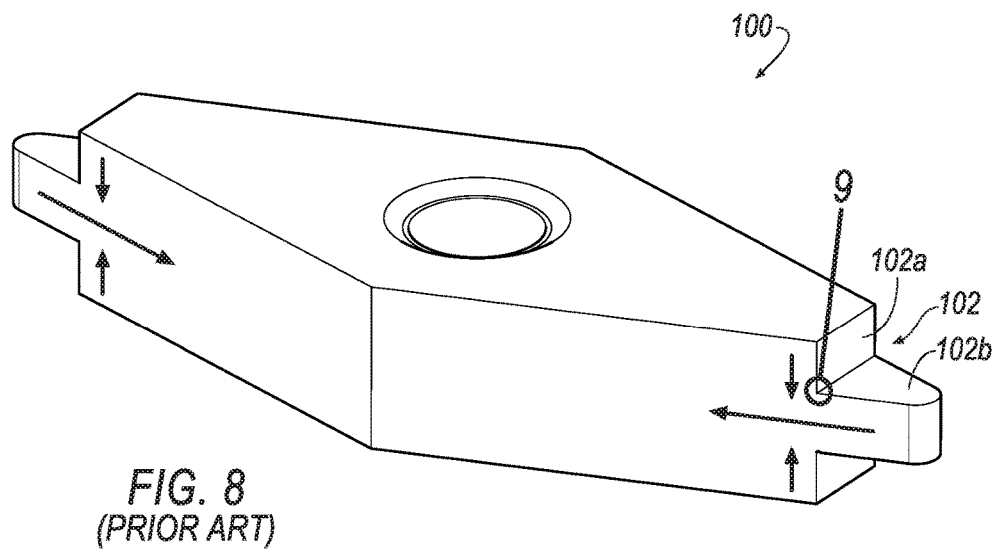
FIG. 8 is an isometric view of a conventional tool carrier.

The cutting tip 16 is typically made of a super-hard material. Such materials include, but is not limited to, diamond, cubic boron nitride, boron sub-oxide, boron carbide, polycrystalline diamond (PCD), polycrystalline cubic boron nitride (PCBN), and silicon carbide-bonded diamond (ScD). As shown in FIG. 2, each cutting tip 16 has a top wall 16a, a bottom wall 16b, a rear wall 16c, a plurality of side walls 16d and a corner radius 16e connecting a pair of side walls 16d. Each cutting tip 16 is mounted in a respective pocket 14 such that the bottom wall 16b and the rear wall 16c of the cutting tip 16 contact the vertical back wall 14a and the horizontal support surface 14b of the pocket 14, respectively.

Each cutting tip 16 is affixed to a respective pocket 14 by any suitable means known in the art. In one embodiment, the cutting tip 16 is affixed to the pocket 14 by brazing a layer of braze alloy material 20. After brazing the cutting tip 16 to the tool carrier 12, the cutting insert 10 may go through standard finishing processes, such as top and bottom grinding, periphery grinding, and desired edge preparation and/or coating.

One aspect of the invention is that the tool carrier 12 includes a notch 22 formed at the intersection between the vertical back wall 14a and the horizontal support surface 14b of the pocket 14. The notch 22 has a non-planar first portion 22a proximate the vertical back wall 14a and formed with a radius, R1, in a range between 0.02 mm and 0.30 mm, and a planar second portion 22b extending between the first portion 22a and the horizontal support surface 14b and formed at an inclination angle, A, with respect to a plane 24 parallel to the horizontal support surface 14b of the pocket 14. It will be appreciated that the magnitude of the radius, R1, and the inclination angle, A, depends upon the dimensions of the tool carrier 12 and cutting insert 16, and therefore the invention is not limited by the magnitude of the radius, R1, and the inclination angle, A. The design for the notch 22 is such that the mold (not shown) will slide on the planar second portion 22b during shrinkage, thereby substantially reducing stress in the notch 22 and eliminating cracking of the tool carrier 12 during the injection molding process.

In one embodiment, the radius, R1, of the non-planar first portion 22a is in the range between about 0.02 mm and about 0.30 mm. For example, the radius, R1, can be about 0.04 mm. The inclination angle, A, of the planar second portion 22b is in the range between about 5 degrees and about 60 degrees. For example, the inclination angle, A, can be about 15 degrees. The length, L, of the planar second portion 22b is in a range between 0.20 and 0.90 times a total length, $L_T$, of the notch 22. For example, the length, L, of the planar second portion 22b can be in about 0.15 mm and the total length, $L_T$, of the notch can be about 0.20 mm.

Figure 9:
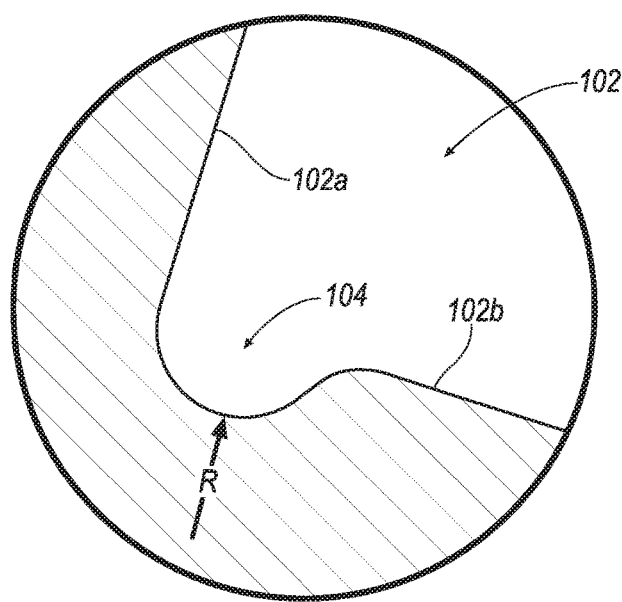
FIG. 9 is a cross-sectional view of a conventional notch formed in the pocket of the conventional tool carrier shown in FIG. 8.

Finite element analysis (FEA) of the design of the notch 22 of the invention shows that the maximum stress in the vicinity of the notch 22 that occurs during shrinkage during the injection molding process decreased by over a factor of 10, as compared to the conventional notch design shown in FIG. 9.

The patents and publications referred to herein are hereby incorporated by reference.

Having described presently preferred embodiments the invention may be otherwise embodied within the scope of the appended claims.

What is claimed is:

1. A tool carrier for a cutting insert, the tool carrier comprising:
    a body;
    a pocket formed in the body for accommodating a cutting tip of a cutting insert, the pocket defined by a vertical back wall and a horizontal support surface; and
    a notch formed at an intersection between the vertical back wall and the horizontal support surface of the pocket,
    wherein the notch has a non-planar first portion proximate the vertical back wall and formed with a radius, R1, and a planar second portion extending between the first portion and the horizontal support surface and formed at an inclination angle, A, with respect to a plane parallel to the horizontal support surface of the pocket.

2. The tool carrier according to claim 1, wherein the planar section portion has a length that is in a range between 0.20 and 0.90 times a total length of the notch.

3. The tool carrier according to claim 1, wherein the planar second portion of the notch has a length that is 0.75 times a total length of the notch.

4. The tool carrier according to claim 1, wherein the radius, R1, is in a range between 0.02 mm and 0.30 mm.

5. The tool carrier according to claim 1, wherein the inclination angle, A, is in a range between 5 degrees and 60 degrees.

6. The tool carrier according to claim 1, wherein the notch has a total length of 0.20 mm.

7. The tool carrier according to claim 1, further comprising a cutting tip affixed to the pocket by brazing.

8. The tool carrier according to claim 7, wherein the cutting tip is affixed to the pocket by brazing.

9. A cutting insert, comprising:
   a cutting tip; and
   a tool carrier comprising:
      a body;
      a pocket formed in the body for accommodating the cutting tip, the pocket defined by a vertical back wall and a horizontal support surface; and
      a notch formed at an intersection between the vertical back wall and the horizontal support surface of the pocket,
   wherein the notch has a non-planar first portion proximate the vertical back wall and formed with a radius, R1, and a planar second portion extending between the first portion and the horizontal support surface and formed at an inclination angle, A, with respect to a plane parallel to the horizontal support surface of the pocket.

10. The cutting insert according to claim 9, wherein the planar section portion has a length that is in a range between 0.20 and 0.90 times a total length of the notch.

11. The cutting insert according to claim 9, wherein the planar second portion of the notch has a length that is 0.75 times a total length of the notch.

12. The cutting insert according to claim 9, wherein the radius, R1, is in a range between 0.02 mm and 0.30 mm.

13. The cutting insert according to claim 9, wherein the inclination angle, A, is in a range between 5 degrees and 60 degrees.

14. The cutting insert according to claim 9, wherein the notch has a total length of 0.20 mm.

15. The cutting insert according to claim 9, further comprising a cutting tip affixed to the pocket by brazing.

16. A method for manufacturing a tool carrier for a cutting insert by using an injection molding process, the tool carrier comprising a body and a pocket formed in the body for accommodating a cutting tip of a cutting insert, the method comprising affixing the cutting tip to the pocket of a tool carrier by brazing, wherein the pocket includes a vertical back wall, a horizontal support surface, and a notch formed at an intersection between the vertical back wall and the horizontal support surface of the pocket for accommodating brazing material, and wherein the notch has a non-planar first portion proximate the vertical back wall and formed with a radius, R1, and a planar second portion extending between the first portion and the horizontal support surface and formed at an inclination angle with respect to a plane parallel to the horizontal support surface of the pocket, and wherein the notch eliminates formation of cracks in the tool carrier during the injection molding process.

17. The method of claim 16, wherein the radius, R1, is in a range between 0.02 mm and 0.30 mm.

18. The method of claim 16, wherein the inclination angle, A, is in a range between 5 degrees and 60 degrees.

* * * * *